(12) United States Patent
Yoshikawa et al.

(10) Patent No.: US 7,295,391 B1
(45) Date of Patent: Nov. 13, 2007

(54) ND FILTER FOR APERTURE DEVICE AND APERTURE DEVICE COMPRISING ND FILTER

(75) Inventors: Munetoshi Yoshikawa, Chichibu (JP); Kazuo Suzuki, Chichibu (JP); Takayuki Wakabayashi, Chichibu (JP); Masayuki Uchiyama, Honjo (JP)

(73) Assignee: Canon Denshi Kabushiki Kaisha, Chichibu-Shi (JP)

( * ) Notice: Subject to any disclaimer, the term of this patent is extended or adjusted under 35 U.S.C. 154(b) by 0 days.

(21) Appl. No.: 11/610,741

(22) Filed: Dec. 14, 2006

(30) Foreign Application Priority Data

Dec. 22, 2005 (JP) ............................ 2005-368938

(51) Int. Cl.
*G02B 5/22* (2006.01)
(52) U.S. Cl. ...................... 359/888; 359/885; 359/889; 396/108
(58) Field of Classification Search .............. 359/885, 359/888, 889; 396/108
See application file for complete search history.

(56) References Cited

U.S. PATENT DOCUMENTS

| | | | |
|---|---|---|---|
| 5,479,298 A * | 12/1995 | Yanagi et al. ............... | 359/888 |
| 6,842,301 B2 | 1/2005 | Nakajima et al. ............ | 359/888 |
| 6,842,302 B2 * | 1/2005 | Nakajima et al. ............ | 359/888 |
| 2004/0240068 A1 * | 12/2004 | Namazue et al. ............ | 359/589 |

FOREIGN PATENT DOCUMENTS

| | | |
|---|---|---|
| JP | 2592949 | 12/1996 |
| JP | 2004-037545 | 2/2004 |
| JP | 2004-037548 | 2/2004 |
| JP | 2004-117467 | 4/2004 |
| JP | 2005-062903 | 3/2005 |

* cited by examiner

*Primary Examiner*—Leonidas Boutsikaris
(74) *Attorney, Agent, or Firm*—Fitzpatrick, Cella, Harper & Scinto

(57) ABSTRACT

This invention decreases deformation of a plastic substrate caused by thermal expansion and contraction in an evaporation process of forming a multi-layered film of an ND filter, thus helping prevent wrinkles. The plastic substrate serving as the base of the ND filter is made of a polyimide-based plastic material having a glass transition temperature of 200° C. or more, has a total transmittance of light of 90% or more, and has a haze factor of 0.5% or less. As the multi-layered film, $Al_2O_3$ films for reduction of the reflectance and $TiO_x$ films for reduction of the transmittance are alternately formed on the substrate.

18 Claims, 9 Drawing Sheets

ND FILTER FOR APERTURE DEVICE AND APERTURE DEVICE COMPRISING ND FILTER

BACKGROUND OF THE INVENTION

1. Field of the Invention

The present invention relates to an ND filter for an aperture device which is suitable for use in a photographing optical system such as a video camera or still video camera, and an aperture device comprising the ND filter.

2. Description of the Related Art

An aperture device mounted in a conventional video camera serves to control the quantity of light entering a solid-state image pickup element, and is stopped down to have a small aperture size when the object field is a high-luminance object field. Thus, on a very fine day or when photographing a high-luminance object, the aperture size becomes small. Because of diffraction of light due to the small aperture, degradation of the image quality may occur.

An example solution for this problem is attaching a film-like ND (Neutral Density) filter to an aperture blade. Then, even if the object field is bright, the aperture does not become smaller than a predetermined size. Namely, when the aperture becomes small, the ND filter is positioned in the optical path to reduce the quantity of light. This prevents the aperture from becoming extremely small even when photographing a high-luminance object.

For example, Japanese Patent No. 2592949 discloses an ND filter in which the transmittance increases stepwise toward the optical axis. Japanese Patent Application Laid-Open No. 2004-117467 discloses an ND filter in which the transmittance increases continuously toward the optical axis. When moving an ND filter having a stepwise density change or density gradation or the like on the optical axis, one can adjust the light quantity without changing the aperture size.

Such an ND filter employs a film-like plastic substrate made of a plastic material, e.g., PET or PEN, which is a material having good optical characteristics and high durability. A multi-layered thin film, obtained by alternately stacking thin film made of a light-absorbing material and thin film for the reduction of reflectance, is formed on the surface of the plastic substrate by the evaporation method or the like.

In the evaporation process of manufacturing the ND filter, however, the longer the time of evaporation process of depositing evaporation particles, melted and evaporated from an evaporation source, on the surface of the plastic substrate becomes, the higher the temperature of the plastic substrate will rise. Thermal expansion coefficient of the plastic substrate and that of the thin film stacked on the plastic substrate are not always equal. The multi-layered thin film may thus interfere with thermal expansion and contraction of the plastic substrate. As a result, deformation such as wrinkles occurs in the finished ND filter. Such a product is not appropriate as an ND filter.

As a method of suppressing deformation such as wrinkles in the ND filter, for example, evaporation process may be performed with a pattern producing mask to form a thin film into a desired shape, being in tight contact with the plastic substrate. This can decrease deformation of the plastic substrate caused by thermal expansion and contraction.

The techniques disclosed in Japanese Patent Application Laid-Open No. 2004-37545, 2004-37548, and 2005-62903 employ a plastic substrate which is made of a norbornene-based plastic material having a glass transition temperature of 120° C. or more. The temperature of the substrate in the evaporation process is maintained lower than the glass transition temperature of the norbornene-based plastic material to suppress deformation caused by thermal expansion and contraction, thus preventing winkles.

Recently, an improvement in sensitivity of the image pickup element leads to a demand for a high-density ND filter having a much smaller light transmittance. To obtain such optical characteristics, the arrangement of the multi-layered film must be changed. More specifically, such schemes as increasing the thickness of a predetermined layer of the multi-layered film, or increasing the number of layers in the multi-layered film is employed. Accordingly, during the evaporation process the temperature of the plastic substrate rises higher, and the high-temperature period in the vacuum chamber becomes longer. In this case, even when evaporation is performed with the pattern producing mask, being in tight contact with the plastic substrate, it cannot suppress deformation of the plastic substrate caused by thermal expansion and contraction.

Each ND filter as disclosed in Japanese Patent Application Laid-Open Nos. 2004-37545, 2004-37548, and 2005-62903 has the substrate made of the norbornene-based plastic material. In the evaporation process of forming a high-density ND filter having a density of, e.g., 1.5 or more, the substrate temperature largely exceeds 120° C., and sometimes reaches almost 200° C. An ordinary norbornene-based plastic material has a glass transition temperature of about 120° C. to 170° C. In the evaporation process to manufacture such a high-density ND filter, the substrate temperature becomes higher than this glass transition temperature. If an ND filter employing a norbornene-based plastic substrate is manufactured under these conditions, a number of wrinkles appear on the portion of the ND filter on which the multi-layered thin film is formed. It is very difficult to eliminate these wrinkles.

SUMMARY OF THE INVENTION

It is an object of the present invention to prevent formation of wrinkles in a case of manufacturing a high-density ND filter with the ordinary evaporation method.

In order to achieve the above object, according to the first aspect of the present invention, there is provided an ND filter for an aperture device, wherein at least one multi-layered thin film which reduces a quantity of transmitted light is formed by an evaporation method on a substrate made of a plastic material, and a glass transition temperature of the plastic material is not less than 200° C.

According to the second aspect of the present invention, there is provided an aperture device comprising at least one ND filter, wherein the ND filter, manufactured by forming at least one multi-layered thin film which reduces a quantity of transmitted light on a substrate made of a plastic material of which glass transition temperature is not less than 200° C., is attached to an aperture blade, and the ND filter reduces the quantity of light passing through an aperture that the aperture blade forms.

According to the third aspect of the present invention, there is provided a camera comprising the aperture device described above which adjusts the quantity of light passing through an optical system, and a solid-state image pickup element which takes an image that the optical system forms.

Further features of the present invention will become apparent from the following description of exemplary embodiments with reference to the attached drawings.

DESCRIPTION OF THE EMBODIMENTS

The present invention will be described in detail with reference to the embodiments shown in the accompanying drawings.

First Embodiment

Figure 1:
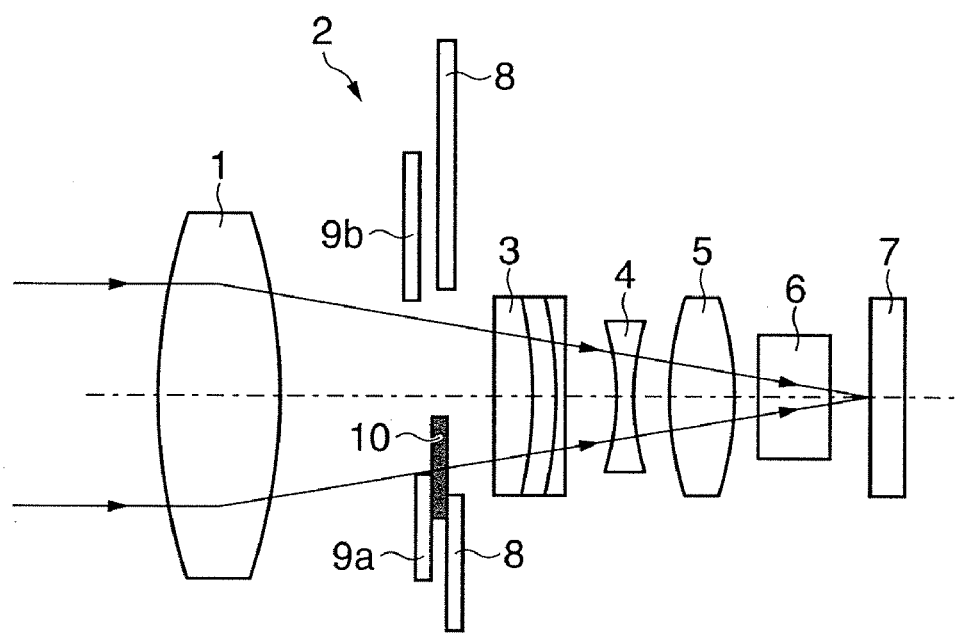
FIG. 1 is a view showing the arrangement of a photographing optical system.

FIG. 1 is a view showing the arrangement of a photographing optical system according to this embodiment. A lens 1, an aperture device 2, lenses 3 to 5, a low-pass filter 6, and a solid-state image pickup element 7 comprising a CCD or the like are sequentially arranged. In the aperture device 2, a pair of aperture blades 9a and 9b are movably attached to an aperture blade support plate 8. An ND filter 10 for reduction of the quantity of light passing through the aperture that the aperture blades 9a and 9b form, is attached to the aperture blade 9a.

A transparent plastic substrate serving as the base of the ND filter 10 is made of a heat-resistant polyimide-based plastic material having a glass transition temperature of 200° C. or more. With the heat-resistant properties, even when the temperature of the plastic substrate reaches almost 200° C. during film formation, the sufficiently high glass transition temperature of the polyimide-based plastic material can effectively suppress formation of wrinkles on the surface of the plastic substrate.

A polyimide-based plastic material which forms the plastic substrate consists of aliphatic polyimide containing aliphatic tetracarboxylic acid as a tetravalent material and diamine as a bivalent material, or contains aliphatic polyimide described above. The plastic substrate has a total transmittance of light of 90% or more so that it is suitable for application to an optical filter. The haze factor which indicates the haze of the plastic substrate is 0.5% or less.

To obtain a high-magnification image, it is necessary to decrease the distance between the lens 1 and the lens 3. Thus, regarding the thickness of the plastic substrate made of the polyimide-based plastic material, it is preferable to form the plastic substrate as thin as possible while maintaining enough rigidity of the ND filter 10. More specifically, preferably, the thickness of the ND filter 10 is 200 μm or less, and more preferably falls within a range of 50 μm to 100 μM.

Figure 2:
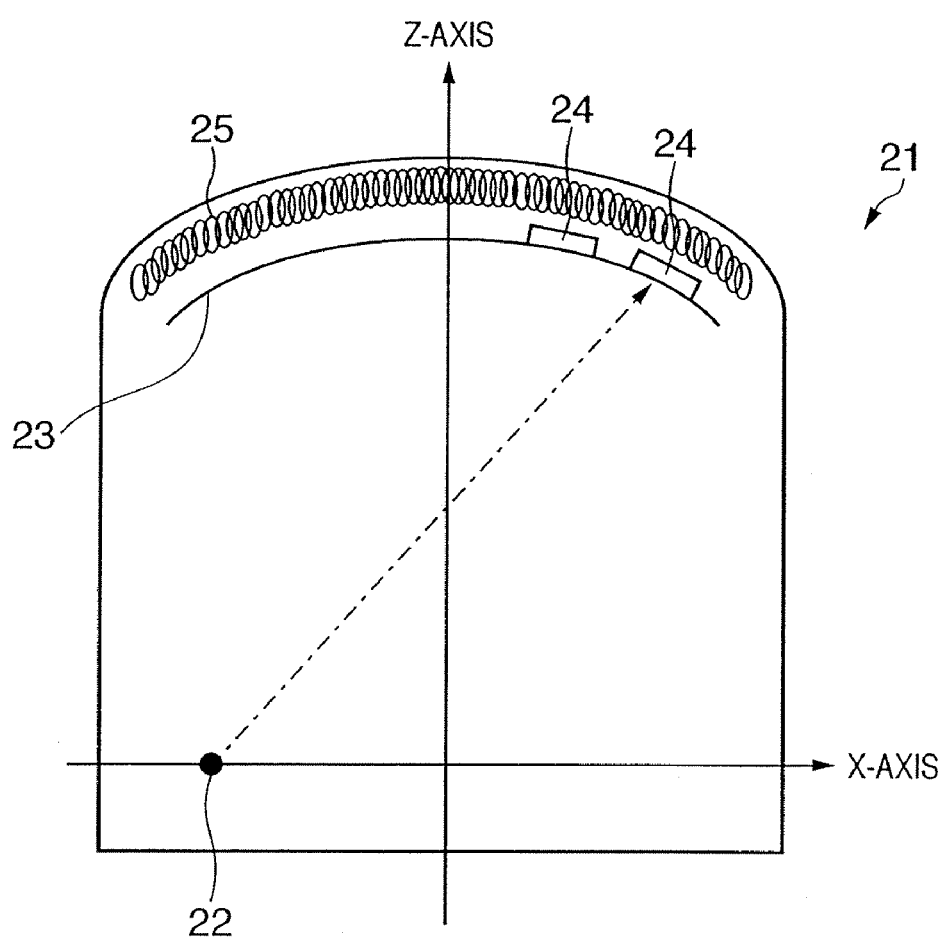
FIG. 2 is a view showing the arrangement in the chamber of a vacuum evaporation machine.

FIG. 2 is a schematic view of the interior of the chamber of a vacuum evaporation machine to manufacture the ND filter 10. The ion plating method, sputtering method, or the like can also perform a process similar to the vacuum evaporation process, and the present invention may employ such a thin film formation method. These thin film formation methods are known widely and accordingly a description thereof will be omitted.

A chamber 21 has an evaporation source 22, substrate dome 23, and plastic substrate 24 in it. The chamber 21 also has a heater 25 to heat the plastic substrate 24 to a temperature appropriate for evaporation method.

Figure 3:
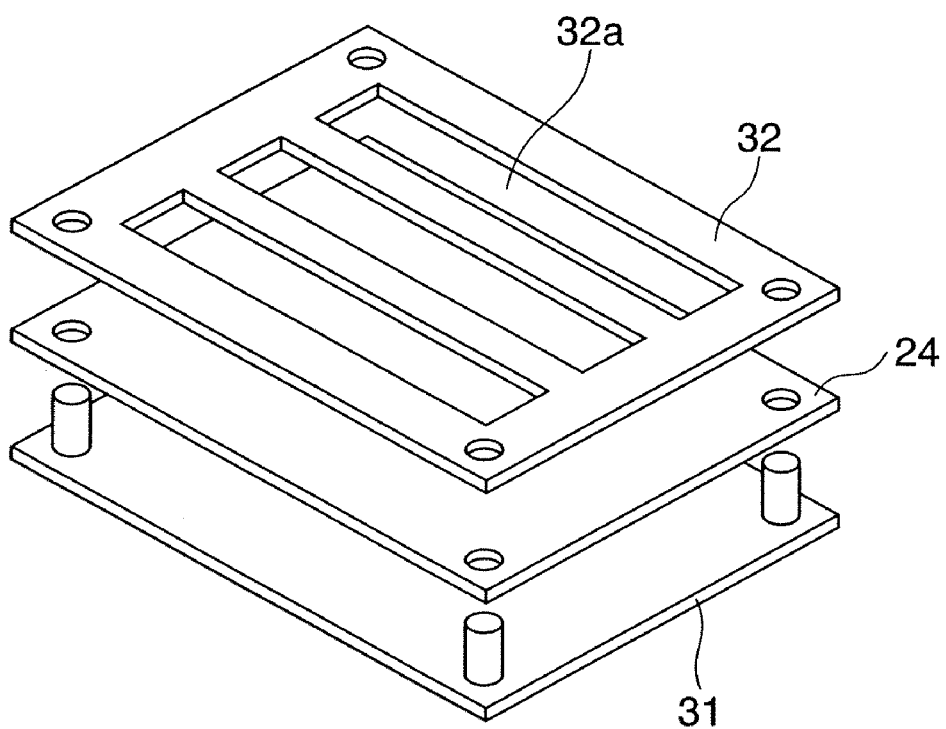
FIG. 3 is a perspective view of a substrate jig.

FIG. 3 is a perspective view of a jig which fixes the plastic substrate. The plastic substrate 24 on which evaporation particles are to be deposited by evaporation method and a mask plate 32 made of a magnetic material are placed in tight contact with each other in this order on a substrate jig 31 on which a magnet (unshown) is arranged. The mask plate 32 has openings 32a, which positions correspond to positions where the multi-layered films are formed. Due to magnetic force, the substrate jig 31 and mask plate 32 attract each other to come into tight contact with each other to decrease the rising of temperature during evaporation process. The plastic substrate 24 is fixed to the substrate dome 23 such that its surface where the multi-layered thin film is to be formed is opposed to the evaporation source 22. The plastic substrate 24 rotates together with the substrate dome 23 about the Z-axis as the center to form a thin film on the plastic substrate 24.

Figure 4:
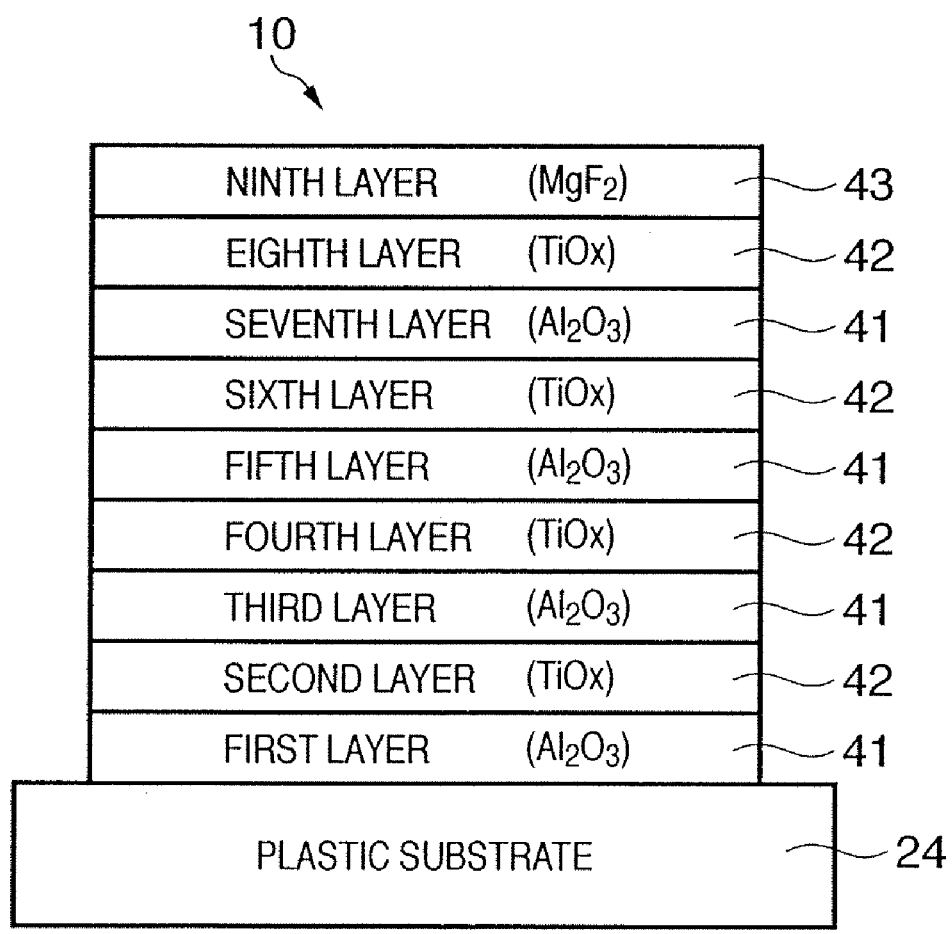
FIG. 4 is a schematic sectional view of an ND filter according to the first embodiment.

FIG. 4 is a schematic sectional view of the ND filter 10. A total of eight layers, i.e., $Al_2O_3$ films 41 serving as anti-reflection films which decrease the reflectance and $TiO_x$ films 42 serving as light absorbing films which decrease the transmittance, are alternately stacked on the plastic substrate 24. An $MgF_2$ film 43 made of a low-refraction material is formed as the uppermost ninth layer having optical film thickness n×d (n: refractive index, d: physical film thickness)=¼λ(λ500 nm to 600 nm). This layer can further decrease the reflectance. Although this embodiment uses the $MgF_2$ film 43 as the uppermost layer, it can employ $SiO_2$ film in place of the $MgF_2$ film 43.

The transmittance of the ND filter 10 changes in accordance with the total thickness of the $TiO_x$ films 42 which are the second, fourth, sixth, and eighth layer (light absorbing films) of multi-layered film. The larger the total film thickness is, the smaller the transmittance becomes. The neutrality of the transmittance within the wavelength range of 400 nm to 700 nm changes in accordance with the number x in the composition of the $TiO_x$ films 42 described above. An adequate selection of x which decreases unevenness in transmittance according to wavelength of light is necessary to achieve the neutrality. The preferable value of x falls within the range of 0.5 to 2.0 (both inclusive). If x=1.2 or less, a phenomenon occurs in which the transmittance of a shorter wavelength light starts to decrease at a wavelength of about 550 nm as the boundary. If x 1.2 or more, the transmittance of the shorter wavelength light increases conversely. It is thus preferable to neutralize the transmittance by monitoring it during evaporation process.

It is also possible to monitor the reflectance during evaporation process to control the thicknesses of the $Al_2O_3$ films 41 as the first, third, fifth, and seventh layer (anti-reflection films) of multi-layered film, thus decreasing the reflectance.

Figure 5:
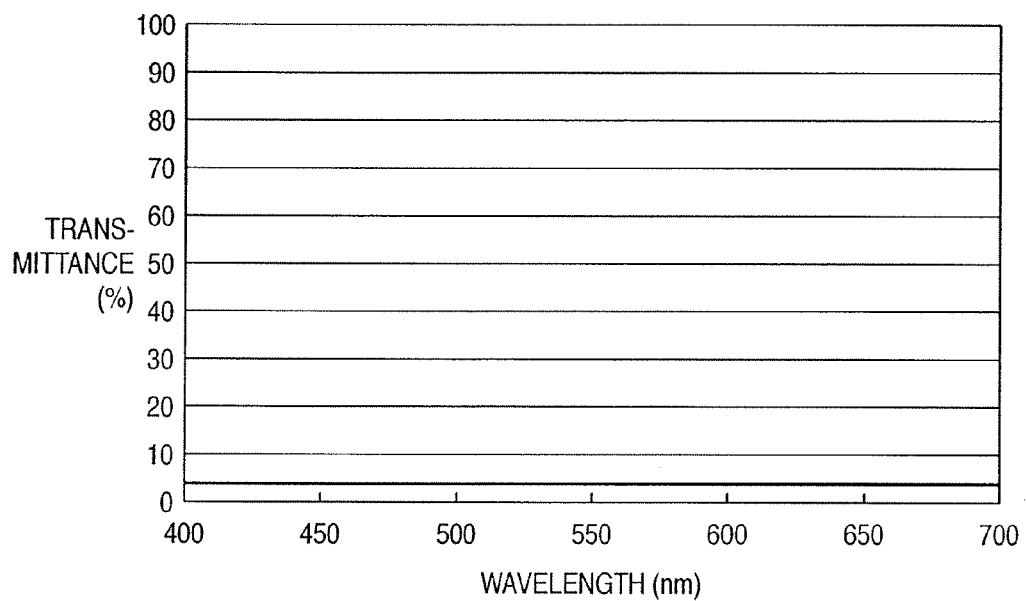
FIG. 5 is a graph of the transmittance characteristics of the ND filter according to the first embodiment.
Figure 6:
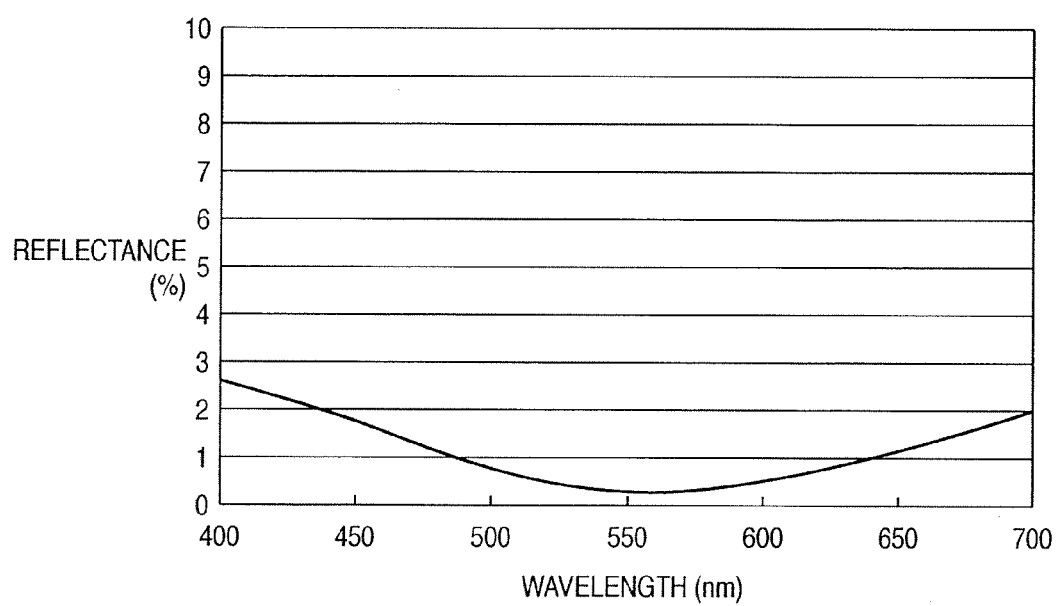
FIG. 6 is a graph of the reflectance characteristics of the ND filter according to the first embodiment.

The transmittance of the ND filter 10 manufactured in this manner has a small unevenness within the wavelength range of λ=400 nm to 700 nm, as shown in FIG. 5, and thus has excellent flatness. As shown in FIG. 6, the reflectance shows sufficiently low values within the wavelength range described above. Thus, the manufactured filter is sufficiently usable as the ND filter 10.

For comparative tests, one transparent plastic substrate 24, which was a 100 µm thickness substrate made of a polyimide-based plastic material (trade name: Neoplim L, manufactured by Mitsubishi Gas Chemical) was employed. For comparison, two types of substrates of the same thicknesses made of PET (trade name: Lumirror, manufactured by Toray Industrials) and a norbornene-based plastic material (trade name: ZEONOR, manufactured by ZEON), respectively, were employed. Each of the three types of plastic substrates 24 was sandwiched between the substrate jig 31 where the magnet was arranged and the mask plate 32 made of the magnetic material.

After setting the plastic substrate 24 on the substrate dome 23 in the chamber 21 of the vacuum evaporation machine, the interior of the chamber 21 was evacuated. With the vacuum evaporation method, an ND filter film comprising nine layers was formed on the plastic substrate 24, as shown in FIG. 4. The ND filter formed in this manner had a uniform density of about 1.5 at the evaporation thin film deposited portion. Namely, an ND filter having a transmittance of about 3.2% was obtained.

The presence/absence of wrinkles in each of the ND filters manufactured respectively employing the three different plastic substrates 24 was evaluated using o (approved) and x (disapproved). Table 1 shows the results.

TABLE 1

| Type of Plastic Substrate | Single-Density ND Filter (Density: 1.5) |
|---|---|
| Polyimide-Based Plastic Substrate | o |
| PET Substrate | x |
| Norbornene-Based Plastic Substrate | x |

As shown in Table 1, in each of the single-density ND filters (density: 1.5) manufactured respectively employing the PET substrate and the norbornene-based plastic substrate, wrinkles appeared at a portion where the multi-layered film was formed. In the single-density ND filter (density: 1.5) manufactured employing the polyimide-based plastic substrate, no wrinkles appeared. An ND filter having a smooth surface was obtained.

Second Embodiment

In the first embodiment, a single-density ND filter having a uniform density multi-layered thin film was manufactured. An ND filter 10 of the second embodiment has a plurality of uniform-density regions respectively having different light transmittance.

Figure 7:
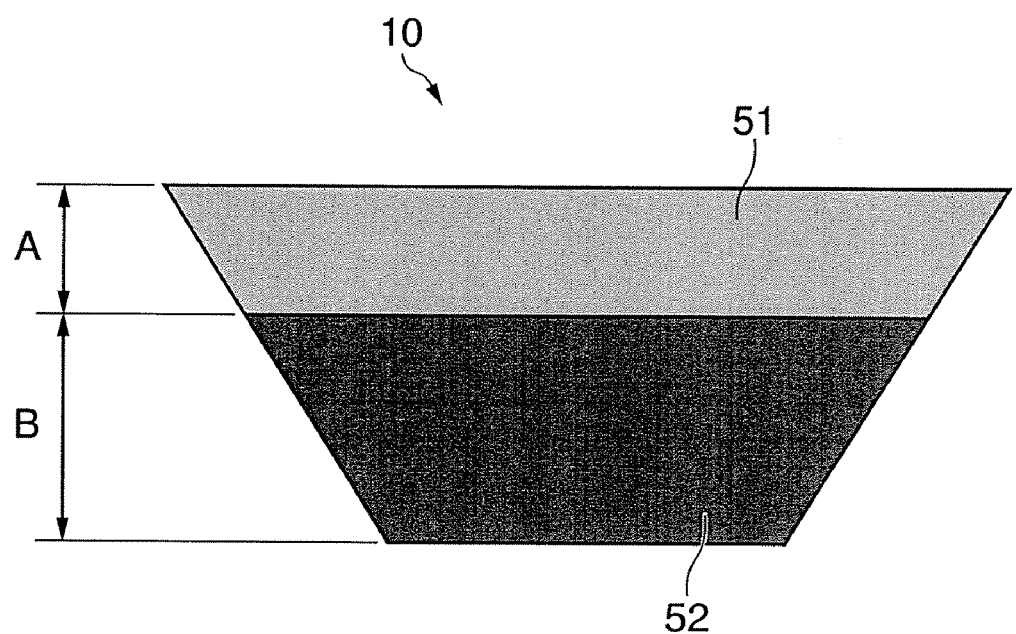
FIG. 7 is a plan view of an ND filter according to the second embodiment.
Figure 8:
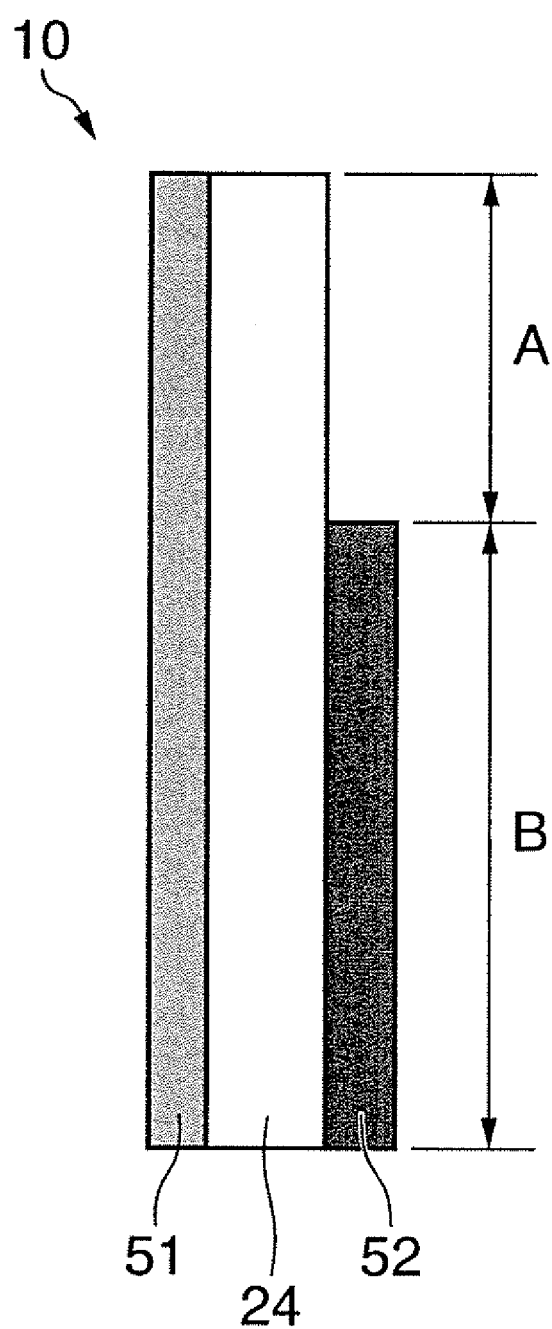
FIG. 8 is a sectional view of the ND filter according to the second embodiment.

FIG. 7 is a plan view of the ND filter 10, and FIG. 8 is a sectional view of the same. Two types of ND filter films 51 and 52 having different densities are formed. First, the ND filter film 51 having desired density was formed on the entire one surface of a transparent plastic substrate 24. Then, a mask was attached to cover a region A on the other surface and to prevent stacking of a multi-layered film. The ND filter film 52 was formed only in a region B to have a desired density.

Each plastic substrate 24 had a thickness of 100 µm, in the same manner as in the first embodiment. Three types of substrates, i.e., a polyimide-based plastic substrate, and a PET substrate and a norbornene-based plastic substrate for comparative tests, were employed. And two different ND filter films 51 and 52 were formed on each substrate by the vacuum evaporation method. A mask was used so that the ND filter had a low density in the region A and a high density in the region B. Each ND filter film 51 comprising nine layers was formed in the same manner as in the first embodiment, to have a density of 0.6. The ND filter film 52 comprising nine layers was also formed in the same manner as in the first embodiment, to have a density of 0.9.

The presence/absence of wrinkles in each of the ND filters manufactured respectively employing the three types of plastic substrates 24 was evaluated using o (approved) and x (disapproved). Table 2 shows the results.

TABLE 2

| Type of Plastic Substrate | Two-Density ND Filter (Densities: 0.6, 1.5) |
|---|---|
| Polyimide-Based Plastic Substrate | o |
| PET Substrate | x |
| Norbornene-Based Plastic Substrate | x |

As shown in Table 2, in each of the ND filters manufactured respectively employing the PET substrate and the norbornene-based plastic substrate, wrinkles appeared at a portion where the multi-layered film was formed. In the ND filter manufactured employing the polyimide-based plastic substrate, no wrinkles appeared. An ND filter having a smooth surface was obtained employing the polyimide substrate, in the same manner as in the first embodiment.

Third Embodiment

Figure 9:
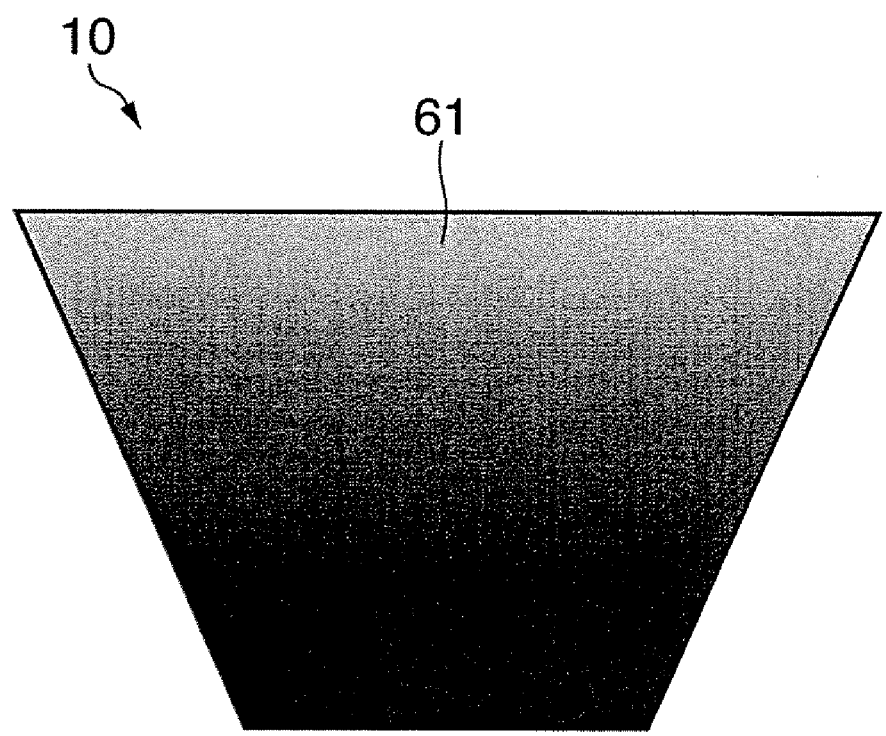
FIG. 9 is a plan view of an ND filter according to the third embodiment.

In an ND filter 10 according to the third embodiment, as shown in FIG. 9, an ND filter film 61 having a gradation density profile in which the density continuously changes from small to large is formed on a plastic substrate 24.

A mask having a shield plate as disclosed in Japanese Patent Application Laid-Open No. 2004-117467 was used. The angle that the shield plate formed with the mask surface was adjustable. A known method of shielding certain part of the plastic substrate with the mask to form a gradation density profile on the plastic substrate 24 was employed.

An $MgF_2$ film, to be stacked as the uppermost layer and made of a material having a low refractive index, served to further enhance the reflection preventive properties, and was formed on the entire surface to satisfy optical film thickness n×d (n: refractive index, d: physical film thickness)=¼λ (λ=500 nm to 600 nm) without using a mask described above.

Each plastic substrate 24 had a thickness of 100 µm, in the same manner as in the first and second embodiments. Three types of substrates, i.e., a polyimide-based plastic substrate, and a PET substrate and a norbornene-based plastic substrate for comparative tests, were employed. The ND filter film 61 having a gradation density was formed by the vacuum evaporation method. More specifically, the ND filter film 61 was formed such that its density continuously changed from about 0.2 to about 1.5, that is, such that the transmittance continuously changed from about 63% to about 3.2%. As the uppermost layer, the $MgF_2$ film was formed on the entire surface to satisfy optical film thickness n×d (n: refractive index, d: physical film thickness) ¼λ without using a mask, as described above.

The presence/absence of wrinkles in each of the ND filters manufactured respectively employing the three types of plastic substrates 24 as described above was evaluated using o (approved) and x (disapproved). Table 3 shows the results.

TABLE 3

| Type of Plastic Substrate | Gradation ND filter (Density: 0.2 to 1.5) |
|---|---|
| Polyimide-Based Plastic Substrate | ○ |
| PET Substrate | x |
| NorborneneBased Plastic Substrate | x |

As shown in Table 3, in each of the ND filters manufactured respectively employing the PET substrate and the norbornene-based plastic substrate, wrinkles appeared at a portion where the multi-layered film was formed. In the ND filter manufactured employing the polyimide-based plastic substrate, no wrinkles appeared. An ND filter having a smooth surface was obtained, in the same manner as in the first and second embodiments employing the polyimide substrate.

When applying the aperture device 2 having the ND filter 10 described in each of the above embodiments to a photographing apparatus such as a video camera or digital still camera in which object image is formed on the solid-state image pickup element 7, it can implement a good-performance photographing apparatus.

The present invention is not limited to the embodiments described above, but can appropriately fall within the scope of the appended claims.

As has been described above, a thin, wrinkle-free ND filter for an aperture device and an aperture device comprising such an ND filter according to the present invention can downsize the optical system and suppress a degradation of resolution, thus achieving a high image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-368938, filed Dec. 22, 2005, hereby incorporated by reference herein in its entirety.

What is claimed is:

1. An ND filter for an aperture device, wherein at least one multi-layered thin film which reduces a quantity of transmitted light is formed by an evaporation method on a plastic substrate made of a plastic material, and a glass transition temperature of said plastic material is not less than 200° C.

2. The ND filter according to claim 1, wherein total transmittance of light of said plastic substrate is not less than 90% and a haze factor of said plastic substrate is not more than 0.5%.

3. The ND filter according to claim 1, including a density profile in which a quantity of transmitted light changes stepwise in accordance with a position where the light is transmitted.

4. The ND filter according to claim 1, including a density profile in which a quantity of transmitted light changes continuously in accordance with a position where the light is transmitted.

5. An aperture device comprising at least one ND filter, wherein said ND filter, which is manufactured by forming a multi-layered film, to reduce a quantity of transmitted light, on a plastic substrate made of a plastic material with a glass transition temperature of not less than 200° C., is attached to an aperture blade, and wherein said ND filter reduces the quantity of light passing through an aperture that said aperture blade forms.

6. A camera comprising an optical system which includes an aperture device according to claim 5, and a solid-state image pickup element which photographs an image that said optical system forms.

7. An ND filter for an aperture device, wherein at least one multi-layered thin film which reduces a quantity of transmitted light is formed by an evaporation method on a plastic substrate made of a polyimide-based plastic material, and a glass transition temperature of said plastic material is not less than 200° C.

8. The ND filter according to claim 7, wherein total transmittance of light of said plastic substrate is not less than 90% and a haze factor of said plastic substrate is not more than 0.5%.

9. The ND filter according to claim 7, including a density profile in which a quantity of transmitted light changes stepwise in accordance with a position where the light is transmitted.

10. The ND filter according to claim 7, including a density profile in which a quantity of transmitted light changes continuously in accordance with a position where the light is transmitted.

11. An aperture device comprising at least one ND filter, wherein said ND filter, which is manufactured by forming a multi-layered film to reduce a quantity of transmitted light on a plastic substrate made of a polyimide-based plastic material with a glass transition temperature of not less than 200° C., is attached to an aperture blade, and said ND filter reduces the quantity of light passing through an aperture that said aperture blade forms.

12. A camera comprising an optical system which includes an aperture device according to claim 11, and a solid-state image pickup element which photographs an image that said optical system forms.

13. An ND filter for an aperture device, wherein at least one multi-layered thin film which reduces a quantity of transmitted light is formed by an evaporation method on a plastic substrate made of a plastic material, and a glass transition temperature of said plastic material is not less than 200° C., and said ND filter has a portion whose density is not less than 1.5.

14. The ND filter according to claim 13, wherein total transmittance of light of said plastic substrate is not less than 90% and a haze factor of said plastic substrate is not more than 0.5%.

15. The ND filter according to claim 13, including a density profile in which a quantity of transmitted light changes stepwise in accordance with a position where the light is transmitted.

16. The ND filter according to claim 13, including a density profile in which a quantity of transmitted light changes continuously in accordance with a position where the light is transmitted.

17. An aperture device comprising at least one ND filter, wherein said ND filter, which is manufactured by forming a multi-layered film, to reduce a quantity of transmitted light, on a plastic substrate made of a plastic material with a glass transition temperature of not less than 200° C. and has a portion whose density is not less than 1.5, is attached to an aperture blade, and wherein said ND filter reduces the quantity of light passing through an aperture that said aperture blade forms.

18. A camera comprising an optical system which includes an aperture device according to claim 17, and a solid-state image pickup element which photographs an image that said optical system forms.

* * * * *

UNITED STATES PATENT AND TRADEMARK OFFICE
CERTIFICATE OF CORRECTION

PATENT NO.         : 7,295,391 B1
APPLICATION NO. : 11/610741
DATED              : November 13, 2007
INVENTOR(S)       : Yoshikawa et al.

It is certified that error appears in the above-identified patent and that said Letters Patent is hereby corrected as shown below:

TITLE PAGE:

Insert item --(65) Prior Publication Data
            US 2007/0153408 A1 Jul. 5, 2007--

TITLE PAGE:

Item [73] Assignee name: "Chichibu-shi(JP)" should read --Chichibu (JP)--

Signed and Sealed this

Twenty-third Day of June, 2009

JOHN DOLL
*Acting Director of the United States Patent and Trademark Office*